(12) United States Patent
Bradley et al.

(10) Patent No.: US 9,408,150 B2
(45) Date of Patent: Aug. 2, 2016

(54) MULTI-CHANNEL LOW POWER WAKE-UP SYSTEM

(71) Applicant: Microsemi Corporation, Aliso Viejo, CA (US)

(72) Inventors: Peter Bradley, Coogee (AU); Andy Bottomley, San Diego, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 139 days.

(21) Appl. No.: 14/482,595

(22) Filed: Sep. 10, 2014

(65) Prior Publication Data

US 2015/0071151 A1  Mar. 12, 2015

Related U.S. Application Data

(60) Provisional application No. 61/876,314, filed on Sep. 11, 2013.

(51) Int. Cl.
*G08C 17/00* (2006.01)
*H04W 52/02* (2009.01)

(52) U.S. Cl.
CPC .................. *H04W 52/0235* (2013.01)

(58) Field of Classification Search
None
See application file for complete search history.

(56) References Cited

U.S. PATENT DOCUMENTS

| | | | | |
|---|---|---|---|---|
| 2009/0252042 A1* | 10/2009 | Bradley | ............. | A61N 1/37276 370/241 |
| 2009/0291656 A1* | 11/2009 | Le Reverend | ..... | H04W 52/0229 455/227 |
| 2011/0184491 A1* | 7/2011 | Kivi | ................... | A61N 1/37276 607/60 |
| 2011/0317600 A1* | 12/2011 | Thomson | ............... | H04B 1/005 370/311 |
| 2012/0069893 A1* | 3/2012 | Shirakata | ............ | H04L 25/0262 375/239 |
| 2012/0286927 A1* | 11/2012 | Hagl | .................. | G07C 9/00309 340/5.61 |
| 2014/0019828 A1* | 1/2014 | Mihai Ionescu | ...... | H04L 1/0057 714/776 |
| 2014/0121727 A1* | 5/2014 | Wang | ................. | A61N 1/37276 607/60 |

* cited by examiner

*Primary Examiner* — Otis L Thompson, Jr.
(74) *Attorney, Agent, or Firm* — Laubscher, Spendlove & Laubscher, P.C.

(57) ABSTRACT

A wake-up system includes an instigator for transmitting a wake-up message from a primary node to a receiver at a secondary node. The instigator sends a wake-up on either first RF channel or a second RF channel having respective frequencies such that the second RF channel is an image of the first RF channel at a local oscillator frequency of the receiver. The receiver includes an RF filter that passes both the image and non-image channels, a frequency generator for generating a local oscillator signal at the local oscillator frequency, and a mixer for mixing the filtered modulated RF signal with said local oscillator signal to generate a modulated intermediate frequency (IF) signal. The receiver monitors both the image and non-image channels simultaneously for a valid wake-up message. A wake-up message detector indicates a wake-up condition in response to the reception of a valid wake-up message.

23 Claims, 11 Drawing Sheets

MULTI-CHANNEL LOW POWER WAKE-UP SYSTEM

CROSS REFERENCE TO RELATED APPLICATION

This application claims the benefit under 35 USC 119 (e) of U.S. provisional application No. 61/876,314, filed Sep. 11, 2013, the contents of which are herein incorporated by reference.

FIELD OF THE INVENTION

This invention relates to the field of radio transmission, and in particular to a method of placing a communications node in a wake-up state in response to a wake-up signal received from a remote instigator.

BACKGROUND OF THE INVENTION

In many communication systems where power is at a premium, such as low-power or battery-powered systems, it is common practice to place the communication nodes in a sleep mode wherein most of the circuits are inactive. In order to establish communications wake-up radios are employed. A wake-up request is sent from a remote instigator to a wake-up receiver of the wake-up radio located at the local node. The wake-up receiver validates the wake-up request by checking that it meets certain predetermined criteria, and in response to a valid wake-up request activates the local receiver so that it can establish communication with the remote transmitter. Typically, two-way transmission is established in which case of course the node will be a transceiver, i.e. including a transmitter.

Wake-up radios are especially useful in communication systems where a low power node is required to start quickly on receipt of an appropriate wake-up signal transmitted from a hub. The initiator of a communication session may be a human or machine user who requires wireless access to the low power node. The expected scheduling of the communication session may be unknown in many applications, and furthermore the actual channel of such a transmission, within a band of channels, may be unknown. Such asynchronous systems that require timely access may use either (i) continuously powered wake-up radios that listen for an incoming signal or (ii) wake-up radios that may listen or "sniff" at intervals for a wake-up signal on each of the potential transmission channels.

Continuously powered wake-up radios have a fast response to a request for a communication session but at the expense of high power consumption or possibly poorer performance in lower power consumption configurations. The preferred option in low power applications is to use the periodic sniffing technique in which the node is in a very low power sleep mode with a timer that periodically starts the wake-up radio, which then sniffs for a wake-up transmission from the hub on each of the potential channels. If a valid wake-up signal is detected then the wake-up radio may instruct the remainder of the node to startup and engage in a full communication session. The time between sniffing is typically set to satisfy the application's minimum latency requirements.

A wake-up operating system comprises two types of entity: a wake-up instigator and a wake-up receiver. The wake-up instigator is the device that transmits the wake-up request whilst the wake-up receiver is the device receiving the wake-up request. There may exist more than one wake-up receiver for a given wake-up request. A wake-up receiver is typically part of a battery powered device or secondary node with low power operating constraints that may perform sensing or control functions as part of the application of the wireless system. A wake-up instigator is typically a hub (or primary node) that connects to remote secondary nodes within a wireless network and often has connectivity to the Internet to facilitate the flow of information and control of the wireless network to users.

SUMMARY OF THE INVENTION

Embodiments of the invention provide a multi-channel communication system intended for low power wake-up applications utilizing one of two RF channels having respective frequencies such that the second RF channel is an image of the first RF channel at a local oscillator frequency at the receiver. They may detect and receive a wake-up transmission with reduced power consumption by examining two channels simultaneously. This arrangement may reduce current consumption by a factor of two in a multi-channel system in which the transmitted channel is unknown and the receiver must scan each possible channel.

According to the present invention there is provided a wake-up system for use in a communications network wherein communications are established between a primary node and one or more secondary nodes over one or more RF communications channels, wherein the secondary nodes are placed in a sleep state in the absence of active communications and are responsive to a wake-up message transmitted from the primary node to enter a wake-up state to permit the establishment of active communications, the wake-up system comprising an instigator for transmitting the wake-up message from a primary node to a receiver at a secondary node, said receiver being configured to sniff at intervals said communications channels for a valid wake-up message, and wherein the instigator comprises a wake-up message generator for generating a wake-up message; a channel selector for generating a select signal to select either first RF channel or a second RF channel having respective frequencies such that the second RF channel is an image of the first RF channel at a local oscillator frequency at the receiver; and a transmitter responsive to said select signal to transmit the wake-up message as a modulated RF signal over the selected RF channel; and wherein the receiver comprises an RF filter for receiving and filtering a modulated RF signal and being configured to pass both said first and second RF channels; a frequency generator for generating said local oscillator frequency; a mixer for mixing the filtered modulated RF signal with said local frequency to generate a modulated IF frequency signal; a demodulator for extracting data from the modulated IF signal; and a wake-up message detector for indicating a wake-up condition in response to a determination that the extracted data represents a valid wake-up message.

It will be appreciated that the expression "at intervals" does not necessarily imply fixed periodic intervals. The intervals between the sniffs may be of fixed periods or of varying periods.

In super-heterodyne receivers, a mixer produces an intermediate frequency, which is typically the difference between the incoming RF frequency and a local oscillator frequency. Consider, for example, an RF carrier frequency lower than the local oscillator frequency so, for example, the RF frequency might be 700 kHz, and the local oscillator frequency 1000 MHz. Such an arrangement would produce an intermediate (IF) frequency at 300 MHz (1000−700) MHz. Such an arrangement of carrier and local oscillator frequencies is known as low side injection. In reality, the mixer produces both a sum and a difference signal, with the sum signal typically filtered out after the mixer. It will be apparent that an RF carrier frequency above the local oscillator frequency, in this example, of 1300 MHz, known as high side injection, will also produce a mixed signal at the same IF frequency at 300 MHz. This second frequency, which is known as the image frequency, is a potential source of interference in conventional super-heterodyne receivers and is therefore rejected by the RF frontend filters. Embodiments of the invention make use of this image frequency to allow the receiver to monitor two channels simultaneously.

Since a signal at the image frequency is a mirror image of the signal at the conventional RF transmission frequency, the wake-up message sent over the image channel is preferably inverted at the transmitter so that the wake-up message received by the wake-up detector at the receiver is the same whether it be sent on the normal channel or the image channel.

Alternatively, the wake-up message may be inverted at the receiver, but this embodiment potentially involves more complexity in the receiver circuitry.

According to another aspect of the invention there is provided a method of establishing communications between a primary node and one or more secondary nodes over one or more RF communications channels, wherein the secondary nodes are placed in a sleep state in the absence of active communications and are responsive to a wake-up message transmitted from the primary node to enter a wake-up state, method comprising:
  at the instigator:
    generating a wake-up message;
    selecting either first RF channel or a second RF channel having respective frequencies such that the second RF channel is an image of the first RF channel at a local oscillator frequency at the receiver; and
    transmitting the wake-up message as a modulated RF signal over the selected RF channel; and
  at the receiver:
    receiving and filtering a modulated RF signal while passing both said first and second RF channels;
    generating said local oscillator frequency;
    mixing the filtered modulated RF signal with said local frequency to generate a modulated intermediate frequency (IF) signal;
    demodulating the modulated IF signal to extract data therefrom; and
    indicating a wake-up condition in response to a determination that the extracted data represents a valid wake-up message.

According to yet another aspect of the invention there is provided a receiver for use in a communications network wherein communications are established between a primary node and one or more secondary nodes over one or more RF communications channels, wherein the secondary nodes are placed in a sleep state in the absence of active communications and are responsive to a wake-up message transmitted from the primary node to enter a wake-up state to permit the establishment of active communications, the wake-up system comprising an instigator for transmitting the wake-up message from a primary node to a receiver at a secondary node, said receiver being configured to sniff said communications channels at intervals for a valid wake-up message, the receiver comprising an RF filter for receiving and filtering a modulated RF signal and being configured to pass both said first and second RF channels; a frequency generator for generating a local oscillator signal at a local oscillator frequency; a mixer for mixing the filtered modulated RF signal with the local oscillator signal to generate a modulated intermediate frequency (IF) signal; a demodulator for extracting data from the modulated IF signal; and a wake-up message detector for indicating a wake-up condition in response to a determination that the extracted data represents a valid wake-up message.

BRIEF DESCRIPTION OF THE DRAWINGS

The invention will now be described in more detail, by way of example only, with reference to the accompanying drawings, in which:—

DETAILED DESCRIPTION OF THE INVENTION

Embodiments of the invention comprise a low-IF architecture configured with a real mixer and relatively low IF frequency. Unlike conventional super-heterodyne radio architectures, which place great emphasis on removing the image frequency, explicit use is made of both the image channel and its corresponding non-image channel for two-channel sensitivity without additional hardware requirements. Ordinarily, a wanted signal transmitted in the image channel will have a spectrum that is mirrored with respect to the same signal in the normal (non-image) channel. In a conventional receiver, the IF frequency is set at a value that makes the non-image and image channels sufficiently far apart to permit easy removal of the image channel by the RF front end filter. The use of a relatively low IF makes the normal and image channels reasonably close and allows them both to be passed by the RF frontend filter.

In accordance with one embodiment of the invention, the polarity of the data transmission (inverted or not inverted) is dependent on which channel (an image as seen by the receiver or non-image) is selected by the instigator for transmitting the wake-up message. This allows a signal to be received on either the image or non-image channels without any additional complexity or current consumption in the receiver.

Embodiments of the invention also allow for successive channel sniffing to mitigate against the negative aspects of receiving two channels simultaneously. Specifically a pattern of channel sniffing can be employed that mitigates the effect of limited adjacent channel rejection where one channel (image or non-image) contains an unwanted signal.

Other embodiments include features that may enhance performance. The use of a hybrid arrangement when complex signal processing following the real signal processing with the complex signal processing performed at low frequencies helps to reduce current consumption. Many modern radio receivers use fully complex receivers requiring processing of two signal paths typically denoted I (in phase) and Q (quadrature phase). The processing of complex signals increases current consumption compared to the processing of real signals.

This hybrid arrangement reduces power consumption because the high frequency processing, which implies higher current consumption, occurs only on a single real channel whilst the lower frequency baseband processing, where the current consumption is less, is complex. The complex baseband processing still allows for high performance demodulation and frequency estimation techniques, facilitating greater sensitivity, faster extraction of wake-up characteristics, and lower power consumption since the overall operation is faster.

Frequency feedback estimation may be used to improve channel filtering and FM-demodulation delay for improved sensitivity and interferer rejection.

Other embodiments invert the wake-up message at the wake-up receiver. This solution involves more complexity at the receiver. Packets containing wake-up messages are often constructed with a pattern of preamble bits used to setup the receiver in preparation for the payload followed by information payload bits. The start of the packet needs to be determined usually by a bit pattern correlator. Moreover, the receiver does not know when to sample the middle of the bits for the best signal for timing recovery, there may be small offsets in frequency between the transmitter and receiver, and DC offsets may need to be removed.

Automatic frequency correction (AFC) and the start-of-packet estimation may be affected by inverted data in some cases, which is another reason why it is slightly simpler to perform the inversion in the transmitter. The range of tolerable frequency offset may be reduced depending on the AFC technique.

Alternatively, the correlator for detecting the start of a packet could accept either inverted or non-inverted signals and determine which pattern correlates. This would then determine whether the data was inverted. Since this determination would occur before the payload was read, the polarity of the data in the payload would be known.

Figure 1:
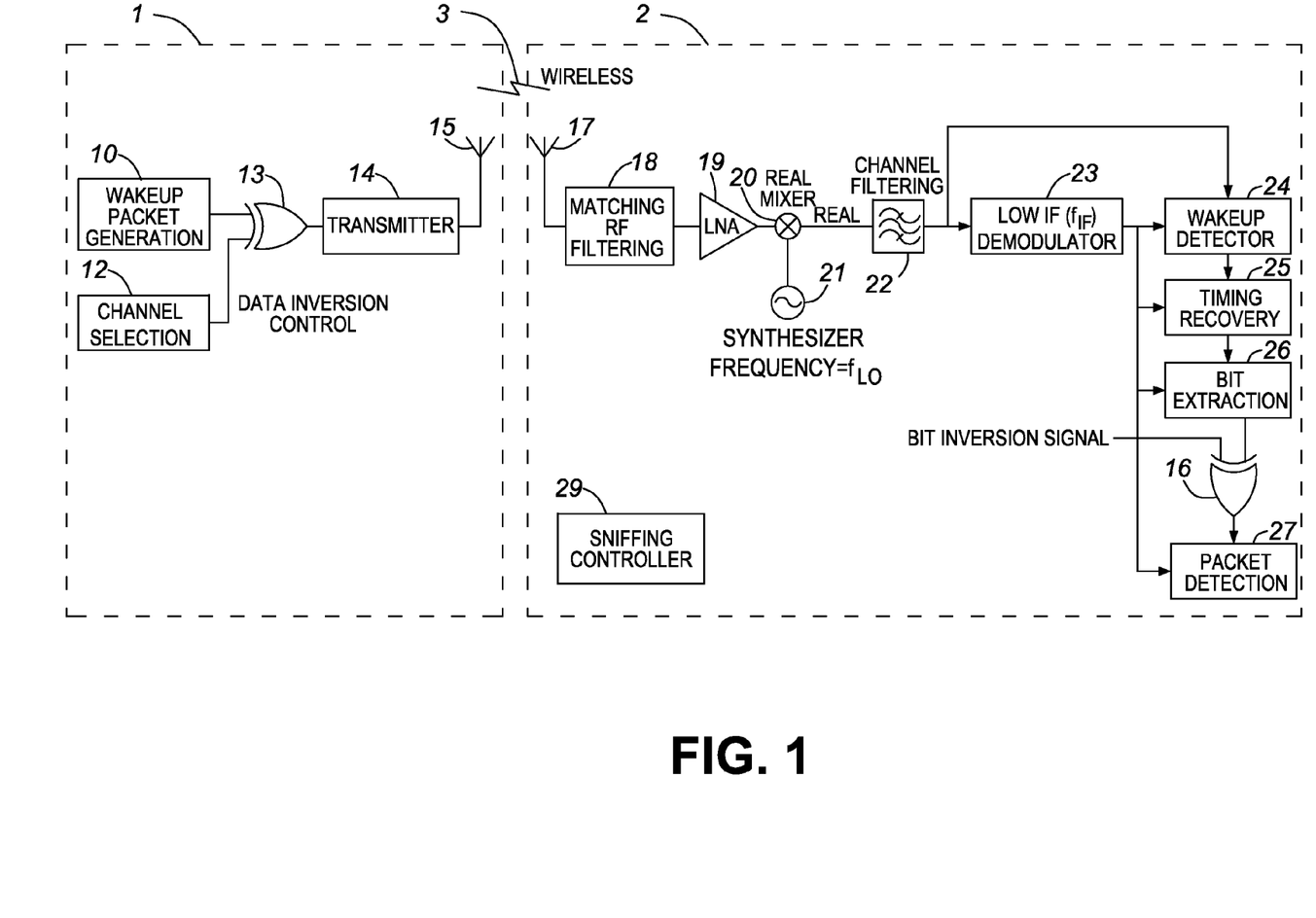
FIG. 1 shows an exemplary high-level architecture for a dual channel low IF wake-up system.

A typical wake-up system in accordance with an exemplary embodiment of the invention is shown in FIG. 1. This wake-up system comprises an instigator 1 communicating with a receiver 2 over RF communication channels 3. The receiver 2 sniffs at intervals for a wake-up message under the control of sniffing controller 29, which determines the sniffing pattern of the receiver.

The wake-up instigator 1 comprises a wake-up packet generator 10 for generating the bit pattern forming the transmitted wake-up message. The bit pattern may be inverted by a data inversion control signal that is set according to the transmitted channel selected by a channel selection module 12 in an exclusive OR gate 13 before being passed to a transmitter 14 for transmission via an antenna 15. The channel selection module 12 selects either a main non-image channel or image channel, and generates the data inversion to control signal to invert the bit pattern or not depending on which channel is chosen.

The wake-up messages transmitted by the transmitter 14 via the antenna 15 are received by an antenna 17 in the receiver 2 and passed to a matching/RF filter module 18, and from the output of the matching/RF filter module 18 to a low noise amplifier (LNA) 19. The matching/RF filter module 18 is a bandpass filter designed to pass both the image and non-image frequencies to the LNA 19 and is further preferably arranged to provide impedance matching between antenna 17 and the input of LNA 19. In certain embodiments, the matching/RF filter module further provides some filtering to remove unwanted interferers. In certain embodiments matching is not required, and only the RF filter portion of matching/RF filter module 18 is provided.

The signal at the output of the LNA 19 is mixed in real mixer 20 with a local oscillator signal generated by a frequency synthesizer 21 to produce an intermediate frequency (IF) signal. This IF signal is filtered in channel filter 22 to remove DC and high frequency mixer products. Frequency synthesizer 21 may be arranged to produce one of a plurality of local oscillator frequencies, as will be described further below. Frequency synthesizer 21 is also called herein a frequency generator without distinction.

The filtered IF signal is passed through a low frequency IF demodulator 23, which demodulates the filtered IF signal and outputs the recovered transmitted data pattern forming the wake-up message. A wake-up detector 24 detects the presence of a wake-up signal by examining the signal characteristics for the bit pattern of a valid wake-up message.

A timing recovery module 25 recovers the timing information required for the bit sampling. A bit extraction module 26 extracts bit data from the demodulated IF signal based on the recovered timing. A packet detection module 27 includes a correlator to detect the start of a packet.

The mixer 20 in this embodiment is a real mixer, and as such does not require generation of a 90-degree phase-shifted version of the local oscillator (LO) frequency as would be the case for a complex mixer. As a result, the frequency synthesizer 21 only needs to run at the LO frequency rather than multiples of the LO frequency. This arrangement reduces current consumption in the frequency synthesizer 21 as well as in the mixer 20 given that the synthesizer 21 generally consumes around half of the current in low-power radio designs.

Figure 2:
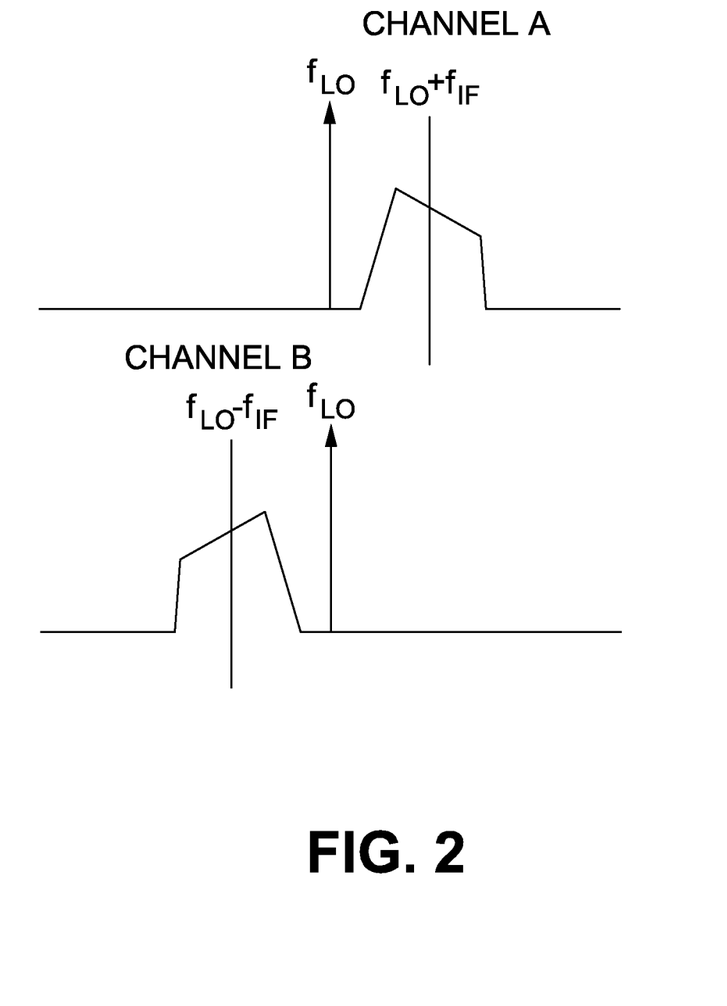
FIG. 2 shows the relationship of two possible received channels to local oscillator and intermediate frequency (IF)

Embodiments of the invention employ a relatively low IF frequency ($f_{IF}$), e.g. 1 MHz. Relatively low in this context means that the non-image and image channels are sufficiently close to be passed by (i) a relatively narrow implementation of the bandwidth channel filter 22 and (ii) the matching/RF filter module 18, which passes two signals, one centered at $f_{LO}+f_{IF}$ (Channel A) and an image of channel A centered at $f_{LO}-f_{IF}$ (Channel B) as shown in FIG. 2. Each of these potential signals represents one of two channels in the system. Channel B is the image of Channel A and vice-versa. Since the architecture does not use image rejection techniques, the receiver is sensitive to two channels at once. Each channel will have 3 dB less sensitivity than a fully complex receiver but it requires less circuitry and operates at lower frequencies thereby consuming much less power. The lower power comes at the expense of minimal alternate channel rejection.

In order to use channel B without additional complexity in the receiver, embodiments of the invention transmit a modified signal when using this channel. The modification and details of this concept are explained with reference to FIGS. 3 to 5.

Figure 3:
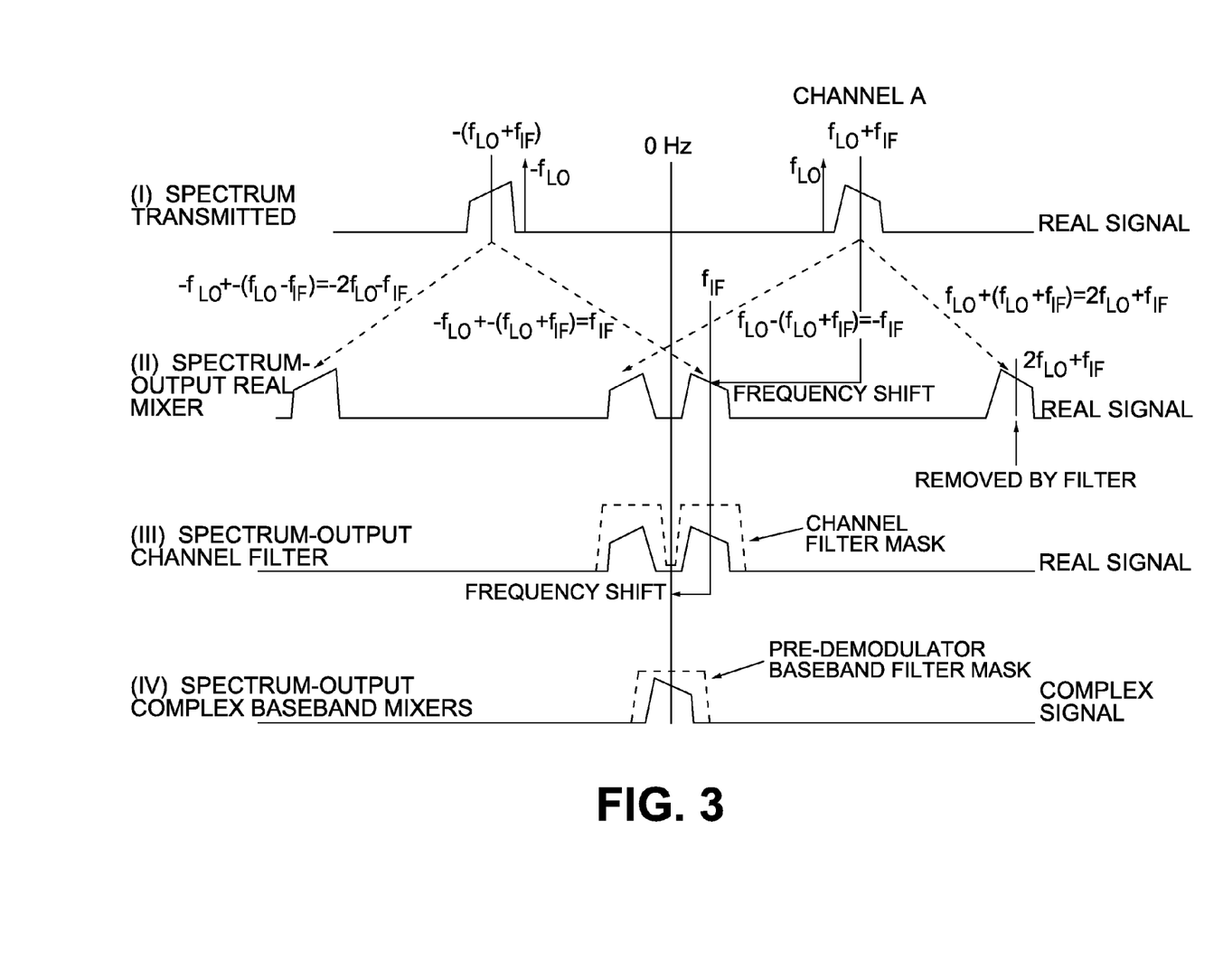
FIG. 3 shows the frequency spectrum for a channel A at various points in the wake-up system.

FIG. 3 shows the frequency spectrum at various points in the system for an exemplary channel A. The signal for Channel A is transmitted using a carrier frequency centered at $f_{LO}+f_{IF}$ as shown in spectra (i). The real mixer 20 mixes this signal by the LO signal, produced by the frequency synthesizer 21, having a frequency $f_{LO}$. The mixer 20 generates sum and difference products that may be constructed by consideration of the negative and positive frequency spectra components. For real signals the spectra ($|H(\omega)|$) is symmetrical about the DC level. That is, $|H(\omega)|=|H(-\omega)|$. Downstream of the mixer 20, the resulting spectra components are centered at $+/-f_{IF}$ and $+/-(2 f_{LO}+f_{IF})$ as shown in spectra (ii). The components ($+/-(2 f_{LO}+f_{IF})$) are filtered by the channel filter 22 with the result shown in spectra (iii).

Figure 4:
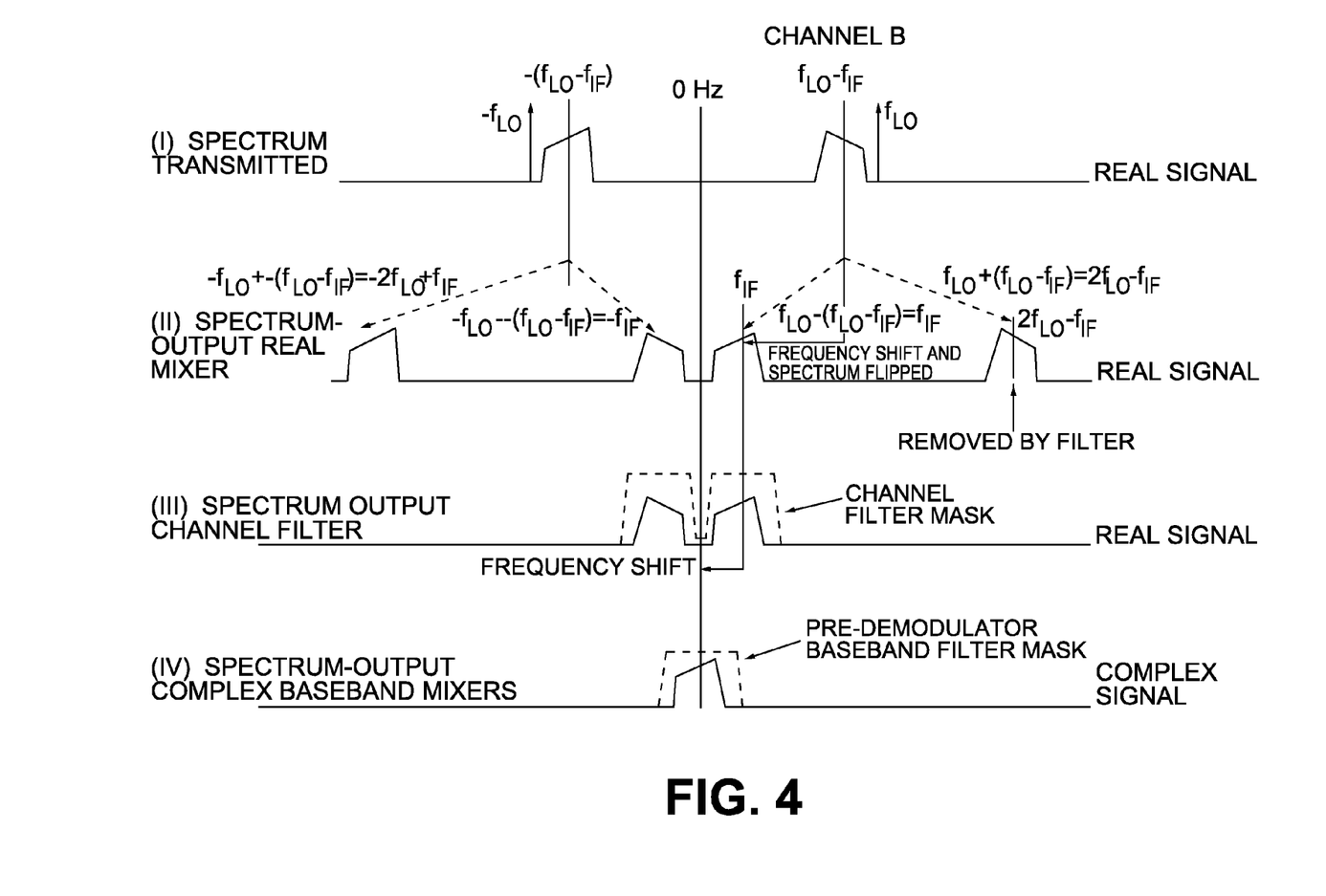
FIG. 4 shows the frequency spectrum for a channel B (non-inverted data=>baseband flipped compared to channel A)
Figure 5:
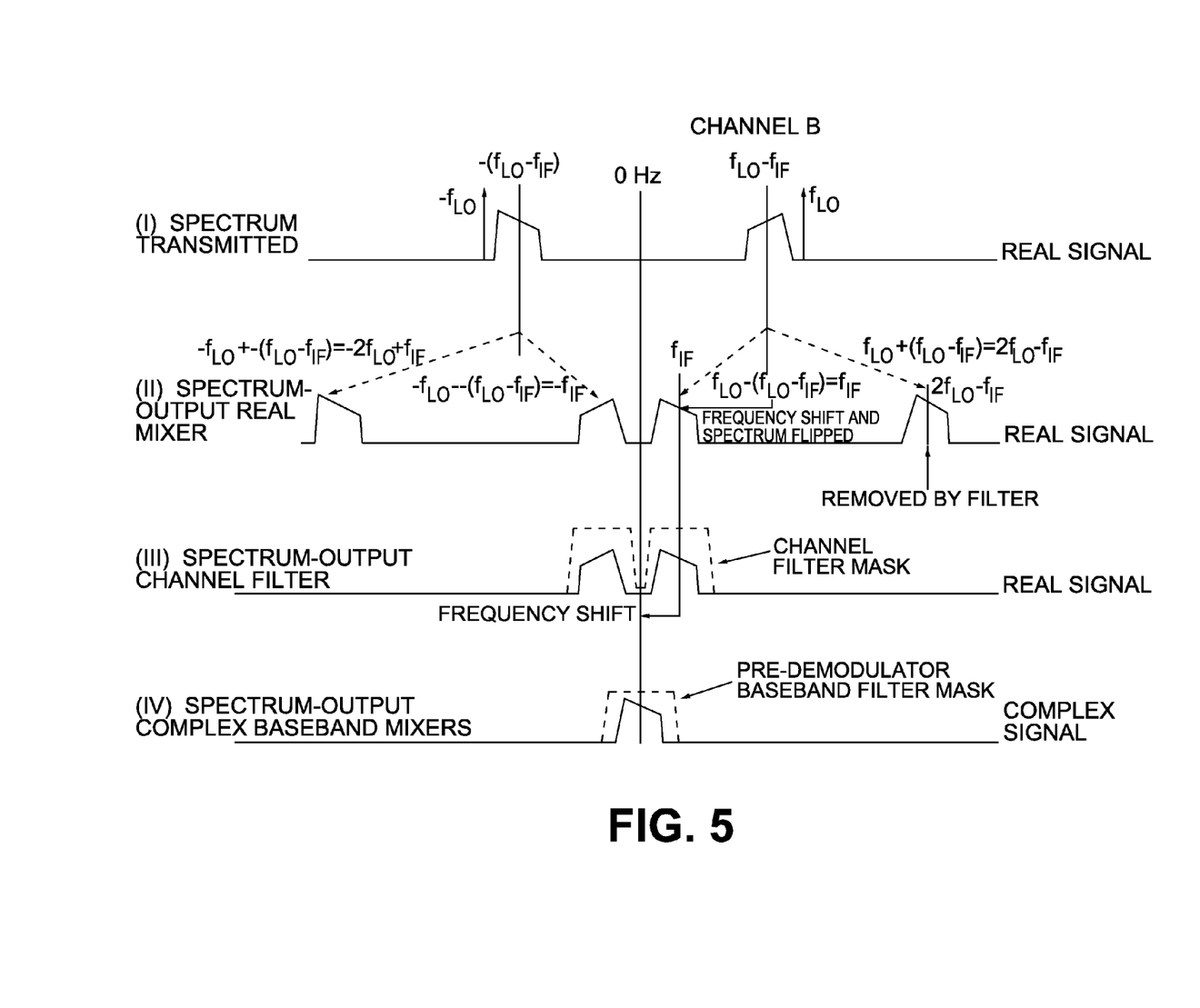
FIG. 5 shows the frequency spectrum for channel B (inverted data=>baseband same as channel A)

Finally, this signal may be optionally converted down to a baseband (0 Hz), as shown in spectra (iv), using a complex multiplication. The signal is multiplied by cosine and sine oscillators running at a frequency $f_{IF}$ to generate in phase and quadrature components. The in-phase and quadrature-phase components constitute a complex signal. The top three spectra plots (i, ii, iii) represent real signals while the bottom spectra plot (iv) presents a complex signal at baseband. The last conversion to the baseband is optional since the low frequency IF demodulator 23 may be constructed to demodulate directly the low-IF signal of plot (iii) or down-convert further and demodulate the signal of plot (iv). The latter case potentially offers some performance improvements as will described later with reference to FIG. 9. The baseband spectrum (iv) is a frequency-shifted version of the transmitted channel A. The low-IF stage with a first stage real mixer advantageously offers the possibility of receiving another channel B centered at $f_{LO}-f_{IF}$. However, there are important differences in channel B compared to channel A as shown in FIGS. 4 and 5. Since channel B uses an LO frequency that is higher than the channel carrier frequency, commonly called high side injection, the mixer 20 produces spectral components centered at $+/-f_{IF}$ and $+/-(2 f_{LO}-f_{IF})$ as shown in spectra (ii). The spectra centered at $+/-f_{IF}$ are flipped relative to the original spectra at $+/-(f_{LO}-f_{IF})$. This flipping where high frequencies are at low frequencies and vice-versa is due to the high side injection, a process that does not occur for Channel A, which uses a local oscillator frequency that is lower than the channel carrier frequency, commonly known as low side injection.

In one embodiment the signal transmitted in channel B is pre-flipped so that the final baseband signal for channel B is identical to channel A as shown in FIG. 5.

Embodiments of the invention transmit signals in channels A and B using a frequency or phase modulation scheme (e.g FSK, m-FSK, QPSK, DQPSK, DBPSK, PSK) in which the data is inverted when transmitting in channel B, preferably not being utilized simultaneously so as to avoid the need for duplication or receiver hardware. The data inversion means that the frequency deviations are opposite mirrors, and this produces a spectra centered at $f_{LO}-f_{IF}$ (for channel B), which is the exact mirror image reflected around $f_c$ of the spectra centered at $f_{LO}+f_{IF}$ (for channel A). This means that the signal in channel A when down-converted to baseband is identical to the signal at channel B when down-converted to baseband.

No additional receiver circuitry is needed to process and demodulate the received RF signal. Expressed another way, in this embodiment the transmitter inverts the data when transmitting into a channel that will be received using high side injection so that the data for the both channels (high side injection and low side injection) will have the same polarity.

Data inversion may be performed in the transmitter using a simple exclusive OR gate 13 as shown in FIG. 1. The bit pattern is inverted by the exclusive OR gate 13 in response to a data inversion control signal that is set based on the channel selected by channel selector module 12.

In an alternative embodiment, instead of inverting data bits in the transmitter for image channels, the data is flipped in the receiver based on the detection of the sign of a recognized predefined pattern in the wakeup data. The detection may be performed by a correlator in the packet detection block. The data inversion in the receiver may be achieved with an optional exclusive OR gate 16 placed on the bit stream output of the bit extraction module 26 as depicted in FIG. 3. The data could also be inverted in response to the wake-up message being received on the image channel or in response to the sign of a recognized correlation or preamble information.

By choosing not to suppress the Image, embodiments of the invention allow the use of a very low intermediate frequency that accommodates low frequency processing and hence low power channel filtering. In the preferred embodiment the channel filter 22 is a band-pass filter where the high-pass cutoff is used to rapidly eliminate the DC offset which can be time-consuming to remove in receiver setups. In wake-up radios, fast startup and settling of circuits are vital to reduce average current consumption since these radios need to start quickly, then sniff (i.e. listen for a short period of time) and then fall back to sleep if no signal is present. Low average current is achieved by reducing the peak current of the design and reducing the time that the circuitry is active.

Transmission of the wake-up signal by the instigator 1 may be done over any one of a plurality channels, which may be selected based on pre-determined criteria, such as detected interference levels. Utilizing the described low IF frequency, and the defining the channels in accordance therewith, 2 channels are simultaneously sniffed by the receiver 2 for each sniff, which reduces power consumption. Each pair of channels is associated with a particular local oscillator frequency $f_{LO}$. The power consumption of the described wake-up systems in which signals may be sent on one of several channels and wherein a pair of channels are simultaneously sniffed rather than sniffed sequentially can be reduced since the RF LNA/mixer and synthesizer, which have high current consumption, are on for a shorter total time. This is an important advantage of wake-up systems that are sensitive to multiple channels simultaneously.

For example, with a fixed synthesizer and an RF LNA/mixer current, $I_{RF}=3$ mA, a low IF filter current $I_{IF}=1$ mA, a baseband processing current $I_{bb}=1$ mA and a sniff time ($T_{sniff}$) of 1 ms, the average current draw for a single channel sniff ($I_{sniff}$) that occurs with a period $T_{p=1}$ second is given by:

$$I_{sniff(} = (I_{RF} + I_{IF} + I_{bb}) \times T_{sniff} / T_p$$
$$= (3+1+1) \times 10^{-3} \times 0.001 / 1$$
$$= 5 \mu A.$$

If two channels are sniffed sequentially with each requiring a 1 ms sniff this will consume twice the current or 10 µA on average. With the two-channel architecture proposed above, no additional current is required to sniff the second channel since the sniff occurs at the same time as the first channel.

Figure 6:
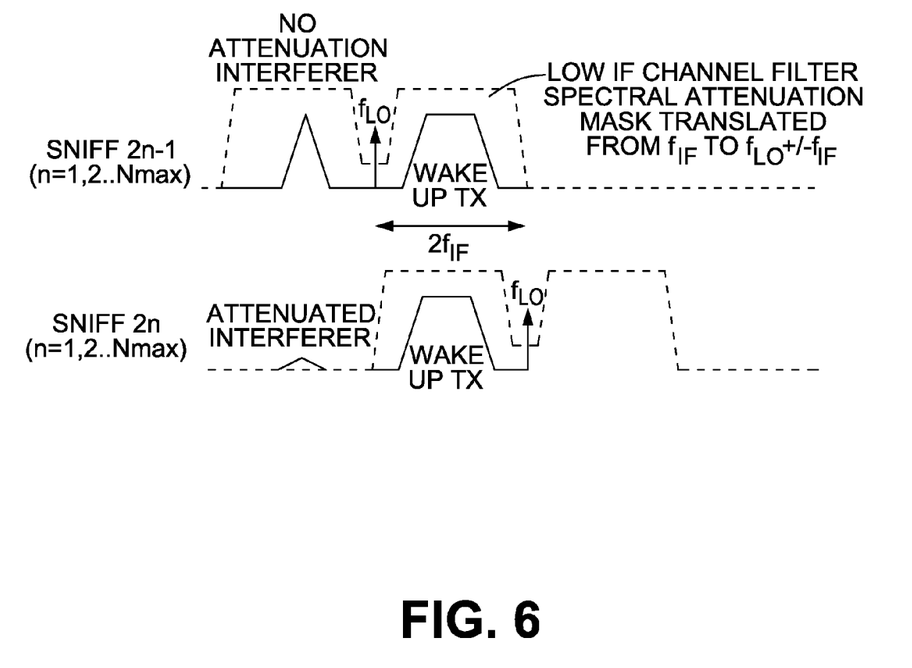
FIG. 6 illustrates a method for reducing the impact of an interferer in adjacent channels.

A potential deficiency in the low power architecture presented is the poor adjacent channel rejection. One of the two channels may contain an interferer or unwanted signal, which could corrupt the wanted signal. Embodiments of the invention include a technique to significantly reduce the impact of this poor rejection. The local oscillator frequency of the wake-up receiver is varied by $+/-f_{if}$ in each sniff in an alternate fashion as shown in FIG. 6. That is, the local oscillator frequency $f_{LO}$ of frequency synthesizer 21 is set as follows:

$f_{LO}=f_{TX}-f_{IF}$           Sniff 1:

$f_{LO}=f_{TX}+f_{IF}$           Sniff 2:

$f_{LO} = f_{TX} - f_{IF}$  Sniff 3:

$f_{LO} = f_{TX} + f_{IF}$  Sniff 4:

etc. . . .

where $f_{TX}$ is the center frequency of the expected high side injection carrier.

In addition, the receiver should invert the data when receiving a channel using high side injection and the transmitted channel has not used pre-inversion of the data in the transmitter or when receiving a channel using low side injection and the transmitted channel has used pre-inversion of the data in the transmitter for low side injection signals.

In this manner an adjacent-channel interferer would have to be present on successive sniffs in two sets of channels to prevent reception, which is much less likely. A single interferer is well tolerated.

Figure 7:
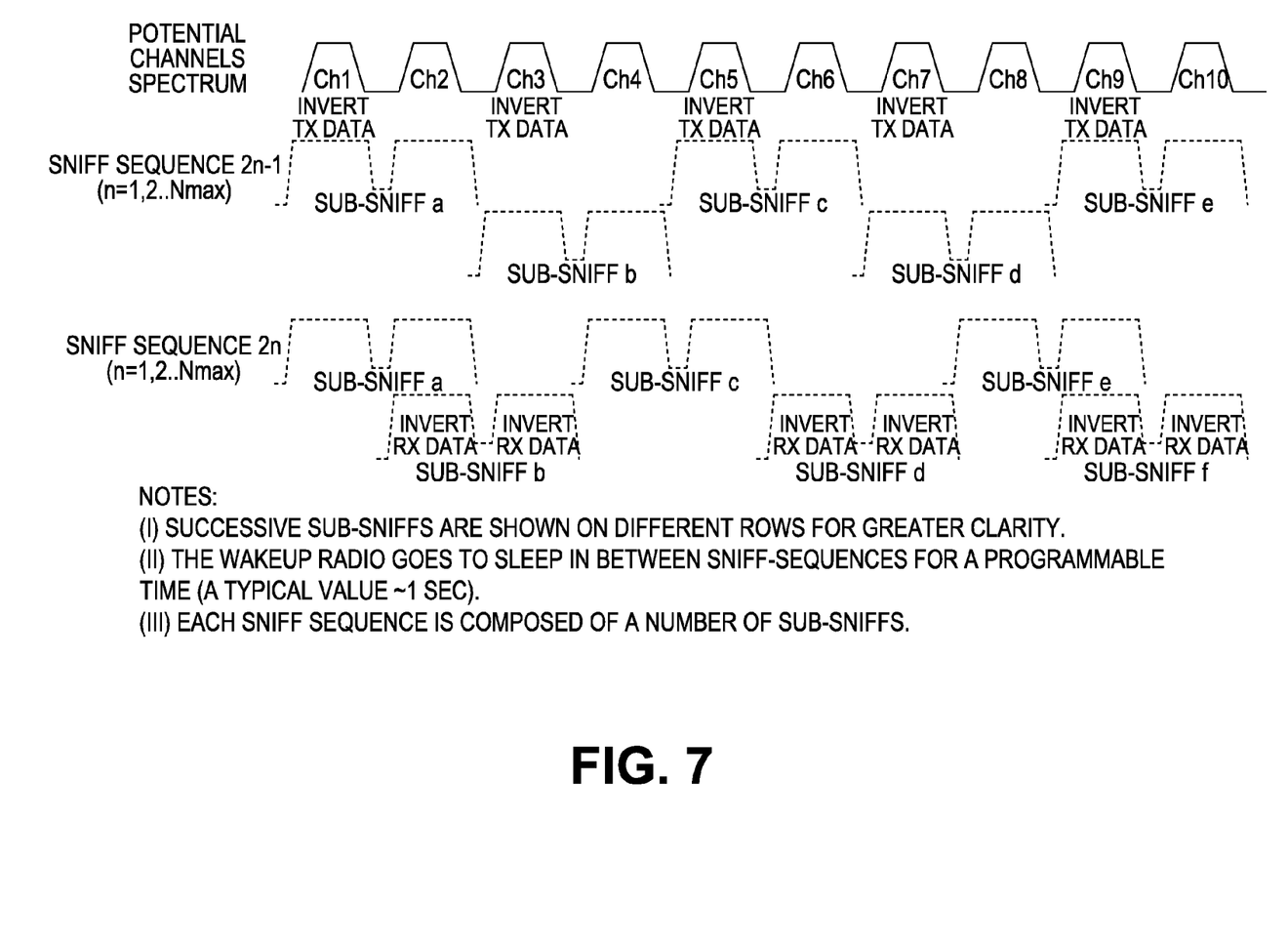
FIG. 7 illustrates a method of sniffing multiple channels.

FIG. 7 shows a further extension and modification of the above scheme for multiple channels. In the example, ten channels are shown. This example would potentially apply to the MICS (Medical Implant Communication Service) band from 402-405 MHz with 10×300 kHz channels. It could also apply to other bands, for example, the commonly used ISM (Industrial Scientific Medical) bands. A first sniff sequence consists of 5 sub-sniffs in which 2 channels, which are images of each other, are checked for a valid wake-up signal with each sub-sniff. The wake-up radio will go back to sleep if no wake-up message is found in this sniff sequence. After a programmed interval the wake-up radio will re-start and perform the next sniff sequence consisting of 6 sub-sniffs again in which 2 channels are checked per sub-sniff. In sniff sequence (2), except for the first and last sub-sniffs, the sub-sniffs are offset by 1 channel from the previous sniff sequence (1) in order to improve adjacent channel interferer handling. Thus, the two types of sniff sequences successively alternate and use the offsetting technique previously shown in FIG. 6 to improve adjacent channel rejection performance. Correct handling of data inversion in the transmitter and receiver is required as shown in FIG. 7.

The power consumption of wake-up systems in which signals may be sent on one of several channels may be reduced if the channels are simultaneously sniffed rather than sniffed sequentially since the large current consumption circuits of the RF LNA/mixer and synthesizer are essentially halved.

Figure 8:
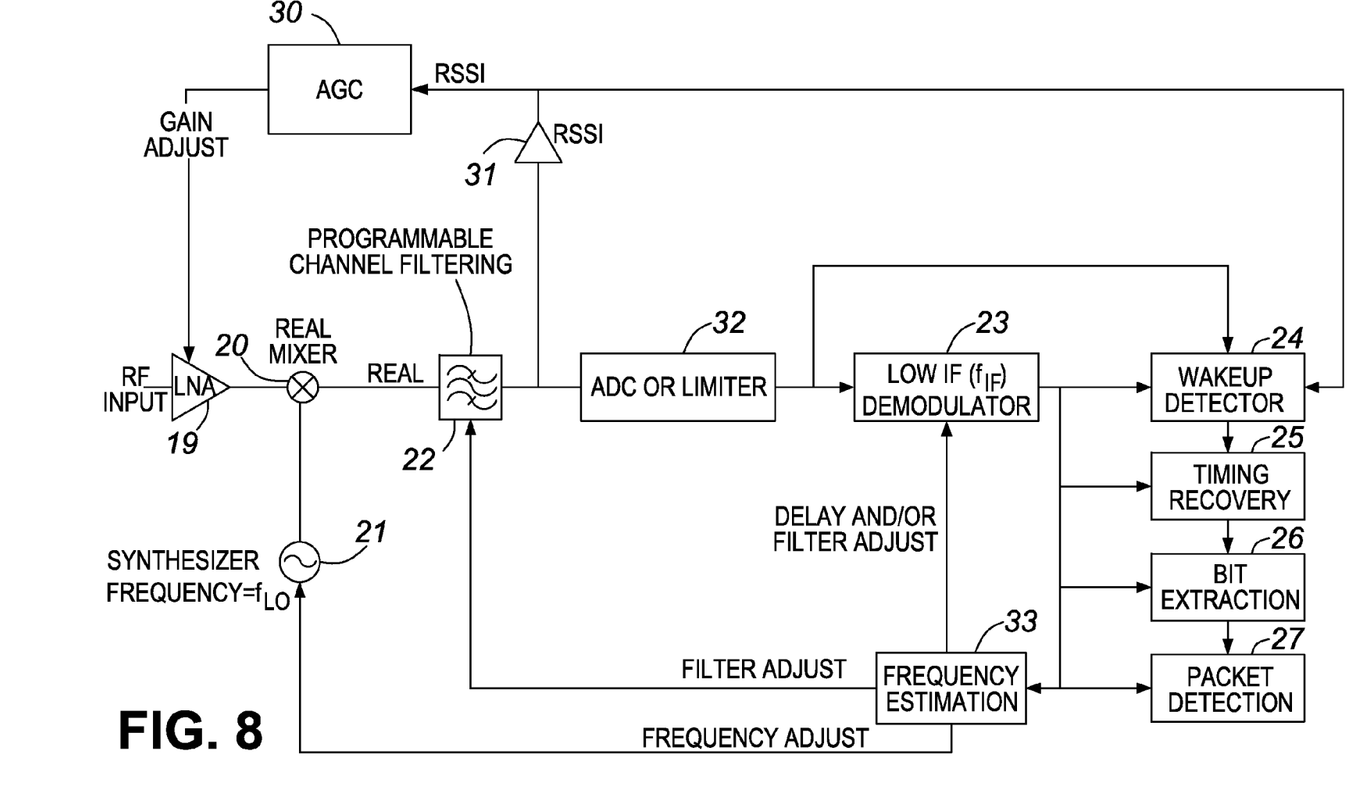
FIG. 8 is a block diagram showing in more detail one embodiment of a dual channel low IF wake-up receiver.

An enhanced receiver 2 is shown in FIG. 8. This additionally comprises an automatic gain control (AGC) module 30 to adjust the gain of the LNA 19 for improved dynamic range and signal handling, a received signal strength indicator module 31 for AGC control and acting as an early signal detection mechanism, and, if digital processing of the signal is desired, an analog-to-digital converter or limiter module 32. A single bit limiter is the preferred low power embodiment when using FSK modulation. A frequency estimator 33 may be used to improve performance by adjusting the frequency synthesizer 21, channel filter 22 and the performance of the demodulator 23.

Figure 9:
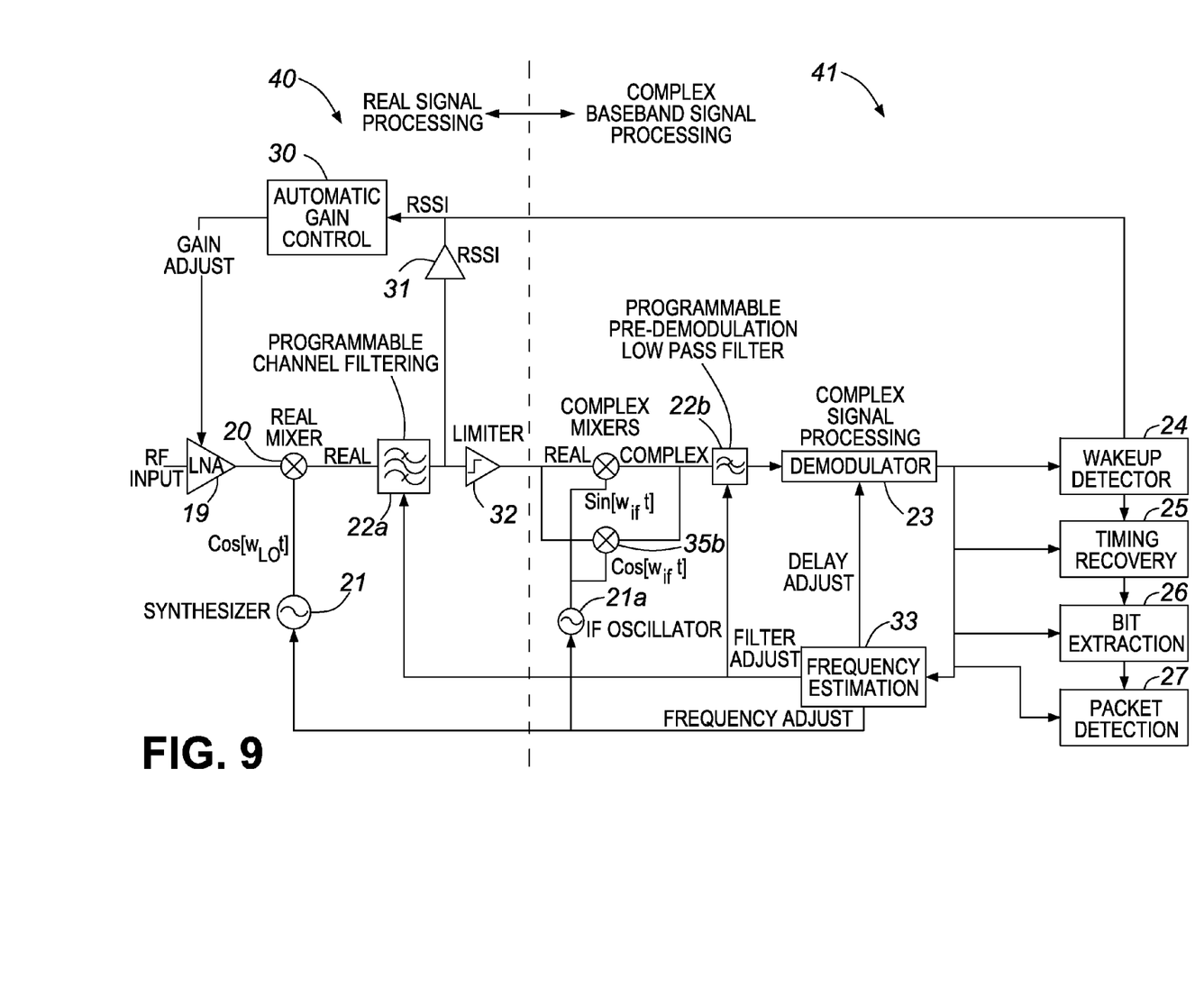
FIG. 9 is a block diagram showing in more detail of one embodiment of a dual channel low IF wake-up receiver with complex baseband.

Another embodiment is shown in FIG. 9. Real signal processing occurs for all signals at frequencies above baseband in upstream section 40. The downstream section 41 includes final stage mixer 35a, 35b, which is a complex mixer that generates an In-phase (I) and Quadrature (Q) component thus forming a complex baseband representation of the signal.

By performing complex processing in the demodulator 23 this embodiment allows for a higher performance demodulator with improved sensitivity and also allows the use of fast feed-forward correlator techniques for data and frequency estimation functions. Faster and higher performance circuits ultimately reduce current consumption since circuits are turned on for a shorter period of time. Thus certain embodiments of the invention include the use of real receiver circuitry followed by complex baseband processing in order to maintain performance in a very low power radio.

The filter bandwidth may be adjusted by the frequency estimator 33. Two channel filters 22a, 22b are employed, one prior to the complex IF mixer 35a, 35b and one after this mixer. On initial operation the received signal may exhibit a large frequency offset, which necessitates the use of wide bandwidth filters. Such filters will increase the noise of the system and degrade ultimate sensitivity. The system is optimized by narrowing of the filter bandwidths following frequency acquisition and estimation.

Further feedback may be made by adjusting demodulator performance parameters such as the delay in a prior art delay and multiply FM demodulator.

The programmable pre-demodulation low-pass filter 22b provides additional finer filtering of noise and unwanted mixer products prior to demodulation.

In addition a digital version of the design may include decimation and decimation filters as needed (not shown) to reduce sampling rates and current consumption. Also the limiter is optional and may be removed (in an analog design) or replaced by an ADC.

Figure 10:
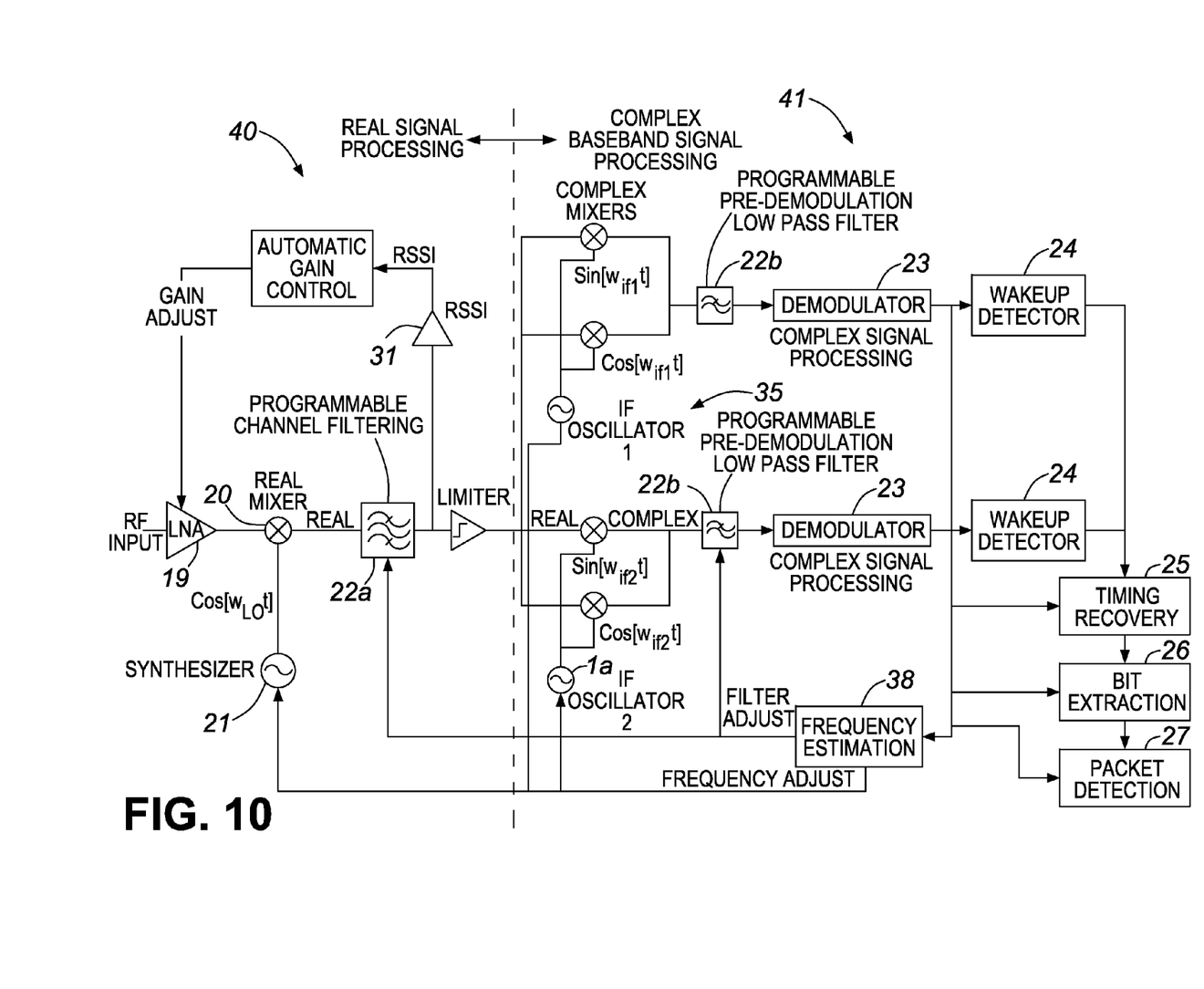
FIG. 10 is a block diagram of an architecture that potentially supports 2, 4, 6 ... 2*n channels (four channels in this example, two for each low IF mixer)

Another embodiment of the invention extends the architecture to support 2, 4, 6 . . . 2*n channels by using a wider bandwidth first channel filter 22a and bank of complex filters 35 and demodulators 23 operating at different IF frequencies as shown in FIG. 10. In the case of 4 channels, using two local oscillators and duplicated baseband we obtain an average current of $$I_{sniff(} = (I_{RF} + I_{IF} + 2^* I_{bb}) \times T_{sniff} / T_p$$

$$= (3 + 1 + 2) \times 10^{-3} \times 0.001 / 1$$

$$= 6 \mu A.$$

This would compare to an average current of 40 μA merely using a sequential sniff of each channel.

Figure 11:
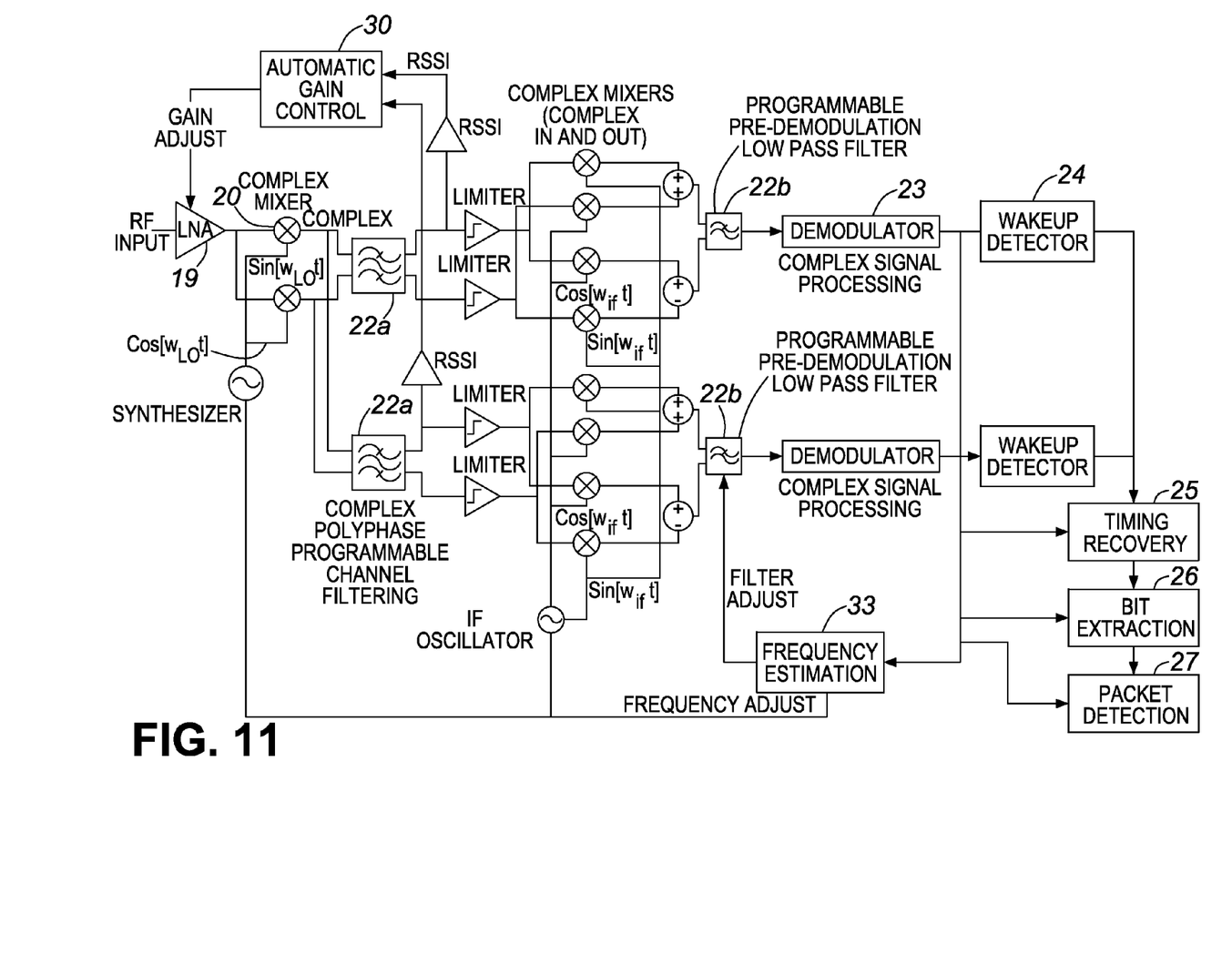
FIG. 11 is a block diagram of a fully complex multi-channel receiver.

An embodiment of a multiple channel wake-up receiver is shown in FIG. 11. This architecture is a fully complex receiver in which all signal processing in the receiver path is performed on complex signals and image rejection is included. This improves adjacent and alternate channel rejection. The first mixer 20 is a complex mixer to generate the in-phase and quadrature complex representation. Two polyphase complex channel filters 22a are used to extract channel A and channel B. Demodulation may be performed directly on the low-IF signals or alternatively, they may be mixed down to baseband using complex mixers 35 (as shown in FIG. 8) for subsequent demodulation in demodulators 23. This scheme requires a higher current consumption then the previous proposals but may be preferred if adjacent channel interferers are very frequently present.

Embodiments of the invention are applicable to ultra-low power communication applications, but are also applicable to high power communication protocols such as WiFi to be used in low power applications. This will broaden the range of suitable applications and use of internet connected WiFi sensors. It also offers advantages in other protocols such as ZigBee. Commercial applications include, but are not limited to, any wireless network that (i) uses battery operated low power nodes, (ii) is predominately asleep and (iii) wherein communication sessions are required but the time of such sessions is unknown and (iv) each session requires a reasonable response time that is less than 10 seconds and typically around 1 second for many applications. Target applications include, but are not limited to, medical devices, both implanted and external, security monitoring, locks and devices, industrial sensors and control systems.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. The functional blocks illustrated herein may in practice be implemented in hardware or software.

The invention claimed is:

1. A wake-up system for use in a communications network wherein communications are established between a primary node and one or more secondary nodes over one or more RF communications channels, wherein the secondary nodes are placed in a sleep state in the absence of active communications and are responsive to a wake-up message transmitted from the primary node to enter a wake-up state to permit the establishment of active communications, the wake-up system comprising an instigator for transmitting the wake-up message from a primary node to a receiver at a secondary node, said receiver being configured to sniff said communications channels at intervals for a valid wake-up message, and wherein:

the instigator comprises:
   a wake-up message generator for generating a wake-up message;
   a channel selector for generating a select signal to select either first RF channel or a second RF channel having respective frequencies such that the second RF channel is an image of the first RF channel at a local oscillator frequency of the receiver; and
   a transmitter responsive to said select signal to transmit the wake-up message as a modulated RF signal over the selected RF channel; and wherein
the receiver comprises:
   an RF filter for receiving and filtering a modulated RF signal and being configured to pass both said first and second RF channels;
   a frequency generator for generating a local oscillator signal at said local oscillator frequency;
   a mixer for mixing the filtered modulated RF signal with said local oscillator signal to generate a modulated intermediate frequency (IF) signal;
   a demodulator for extracting data from the modulated IF signal; and
   a wake-up message detector for indicating a wake-up condition in response to a determination that the extracted data represents a valid wake-up message.

2. A wake-up system as claimed in claim 1, comprising an inverter at the transmitter responsive to a data inversion control signal from the channel selector to invert the wake-up message when the second RF channel is selected.

3. A wake-up system as claimed in claim 2, wherein said wake-up message comprises a predetermined bit pattern and said inverter is an exclusive OR gate controlled by said select signal.

4. A wake-up system as claimed in claim 1, comprising an inverter at the receiver configured to invert an incoming wake-up message on the second RF channel.

5. A wake-up system as claimed in claim 4, wherein the receiver is configured to invert the data in the received RF signal based on the sign of a recognized correlation or preamble information.

6. A wake-up system as claimed in claim 1, wherein the frequency generator is configured to vary said local oscillator frequency in alternate sniffs by $+/-f_{IF}$ where $f_{IF}$ is the intermediate frequency.

7. A wake-up system as claimed in claim 1, wherein the receiver is responsive to multiple pairs of RF channels, and is configured to check each pair of channels in sequence for a valid wake-up message during each sniff.

8. A wake-up system as claimed in claim 7, wherein each sniff comprises a sequence of sub-sniffs in which the receiver checks a different pair of RF channels for a valid wake-up message, and wherein in successive sniffs the pairs of RF channels checked in each sub-sniff are offset from the pairs of RF channels checked in each sub-sniff of a preceding sniff.

9. A wake-up system as claimed in claim 8, wherein in successive sniffs the pairs of channels are offset by one channel relative to the pairs of channels in the preceding sniff.

10. A wake-up system as claimed in claim 1, wherein said receiver comprises an upstream IF section configured to perform real signal processing, and a downstream baseband section including a complex mixer for generating a complex baseband representation of a wake-up message signal, and said downstream baseband section comprises a bank of complex mixers, filters and demodulators operating at different IF frequencies.

11. A method of establishing communications between a primary node and one or more secondary nodes over one or more RF communications channels, wherein the secondary nodes are placed in a sleep state in the absence of active communications and are responsive to a wake-up message transmitted from the primary node to enter a wake-up state, method comprising:

at the instigator:
   generating a wake-up message;
   selecting either a first RF channel or a second RF channel having respective frequencies such that the second RF channel is an image of the first RF channel at a local oscillator frequency of the receiver; and
   transmitting the wake-up message as a modulated RF signal over the selected RF channel; and
at the receiver:
   receiving and filtering a modulated RF signal while passing both said first and second RF channels;
   generating a local oscillator signal at said local oscillator frequency;
   mixing the filtered modulated RF signal with said local oscillator signal to generate a modulated intermediate frequency (IF) signal;
   demodulating the modulated IF signal to extract data therefrom; and
   indicating a wake-up condition in response to a determination that the extracted data represents a valid wake-up message.

12. A method as claimed in claim 11, further comprising: inverting data in the wake-up message at the instigator when the second RF channel is selected.

13. A method as claimed in claim 12, wherein said wake-up message comprises a predetermined bit pattern that is inverted when said second RF channel is selected.

14. A method as claimed in claim 11, further comprising: inverting data in the wake-up message at the receiver when the second RF channel is selected.

15. A method as claimed in claim 14, wherein the data in the incoming wake-up message is inverted based on the sign of a recognized correlation or preamble information.

16. A method as claimed in claim 11, further comprising: varying the local oscillator frequency in alternate sniffs by $+/-f_{IF}$ where $f_{IF}$ is the intermediate frequency.

17. A method as claimed in claim 11, wherein multiple pairs of RF channels are pre-determined frequencies are available, the method further comprising:
setting the local oscillator frequency to check each pair of channels in sequence for a valid wake-up message during each sniff, and wherein each sniff comprises a sequence of sub-sniffs in which the receiver checks a different pair of RF channels for a valid wake-up message, and wherein in successive sniffs the pairs of RF channels checked in each sub-sniff are offset from the pairs of RF channels checked in each sub-sniff of a preceding sniff.

18. A method as claimed in claim 17, wherein in successive sniffs the pairs of channels are offset by one channel relative to the pairs of channels in the preceding sniff.

19. A receiver for use in a communications network wherein communications are established between a primary node and one or more secondary nodes over one or more RF communications channels, wherein the secondary nodes are placed in a sleep state in the absence of active communications and are responsive to a wake-up message transmitted from the primary node to enter a wake-up state to permit the establishment of active communications, the wake-up system comprising an instigator for transmitting the wake-up message from a primary node to a receiver at a secondary node, said receiver being configured to sniff said communications channels at intervals for a valid wake-up message, the receiver comprising:
- a generator arranged to generate a local oscillator signal at a local oscillator frequency;
- an RF filter for receiving and filtering a modulated RF signal and being configured to pass both a first and a second RF channels, said first and second RF channels being mirrors of each other about said local oscillator frequency;
- a mixer for mixing the filtered modulated RF signal with said local oscillator signal to generate a modulated intermediate frequency (IF) signal;
- a demodulator for extracting data from the modulated IF signal; and
- a wake-up message detector for indicating a wake-up condition in response to a determination that the extracted data represents a valid wake-up message.

20. A receiver as claimed in claim 19, further comprising an inverter configured to invert an incoming wake-up message on the second RF channel.

21. A receiver as claimed in claim 19, wherein the receiver is responsive to multiple pairs of RF channels, and is configured to check each pair in of channels in sequence for a valid wake-up message during each sniff.

22. A receiver as claimed in claim 21, wherein each sniff comprises a sequence of sub-sniffs in which the receiver checks a different pair of RF channels for a valid wake-up message, and wherein in successive sniffs the pairs of RF channels checked in each sub-sniff are offset from the pairs of RF channels checked in each sub-sniff of a preceding sniff.

23. A receiver as claimed in claim 19, further comprising an upstream IF section configured to perform real signal processing, and a downstream baseband section including a complex mixer for generating a complex baseband representation of a wake-up message signal.

* * * * *